United States Patent

Yamashita et al.

[11] Patent Number: 6,025,834
[45] Date of Patent: Feb. 15, 2000

[54] METHOD OF PROCESSING AN ABNORMAL STATUS BY MEANS OF TOUCH-PANEL MONITOR AND APPARATUS THEREFOR

[75] Inventors: Tomimasa Yamashita, Kameyama; Katsuhiro Hagino, Suzuka, both of Japan

[73] Assignee: Honda Giken Kogyo Kabushiki Kaisha, Tokyo, Japan

[21] Appl. No.: 08/578,147

[22] Filed: Dec. 27, 1995

[30] Foreign Application Priority Data

Dec. 27, 1994 [JP] Japan .................................. 6-324698
Oct. 17, 1995 [JP] Japan .................................. 7-268404

[51] Int. Cl.[7] .................................................. G06F 15/24
[52] U.S. Cl. .......................................... 345/173; 345/117
[58] Field of Search .................................... 345/173, 156, 345/174, 175, 176, 177, 178, 117; 364/189, 190

[56] References Cited

U.S. PATENT DOCUMENTS

| | | | |
|---|---|---|---|
| 4,286,289 | 8/1981 | Ottesen et al. | 345/173 |
| 4,587,630 | 5/1986 | Straton et al. | 345/173 |
| 4,942,514 | 7/1990 | Miyagaki et al. | 345/173 |
| 5,235,509 | 8/1993 | Mueller et al. | 345/173 |
| 5,461,560 | 10/1995 | Uribe | 345/173 |
| 5,475,835 | 12/1995 | Hickey | 345/173 |
| 5,491,495 | 2/1996 | Ward et al. | 345/173 |
| 5,508,911 | 4/1996 | Vanko et al. | 345/173 |
| 5,559,301 | 9/1996 | Bryan, Jr. et al. | 345/173 |
| 5,594,471 | 1/1997 | Deeran et al. | 345/173 |

*Primary Examiner*—Steven J. Saras
*Assistant Examiner*—John Suraci
*Attorney, Agent, or Firm*—Dickstein Shapiro Morin & Oshinsky LLP

[57] ABSTRACT

Disclosed is a method and apparatus of processing an abnormal status in an automated parts shelf system, in which information of the occurrence of the abnormal status and the location, the content, and the cause of such an abnormal status, as well as an appropriate countermeasure for processing the abnormal status, are displayed on a touch-panel monitor. An abnormal status is displayed on a fundamental screen, which is, upon a pressing action thereon, converted to an abnormal status screen M2, on which necessary items of instruction are displayed. An item therein is selected and entered for processing the abnormal status.

10 Claims, 7 Drawing Sheets

METHOD OF PROCESSING AN ABNORMAL STATUS BY MEANS OF TOUCH-PANEL MONITOR AND APPARATUS THEREFOR

BACKGROUND OF THE INVENTION

1. Field of the Invention

The present invention relates to a method of processing an abnormal status and an apparatus therefor, capable of displaying the content of an abnormal status on a touch-panel monitor, and for processing the abnormal status to eliminate such a status in a manner of dialog communication with the displayed screen of the touch-panel monitor.

2. Brief Description of the Prior Art

Figure 7:
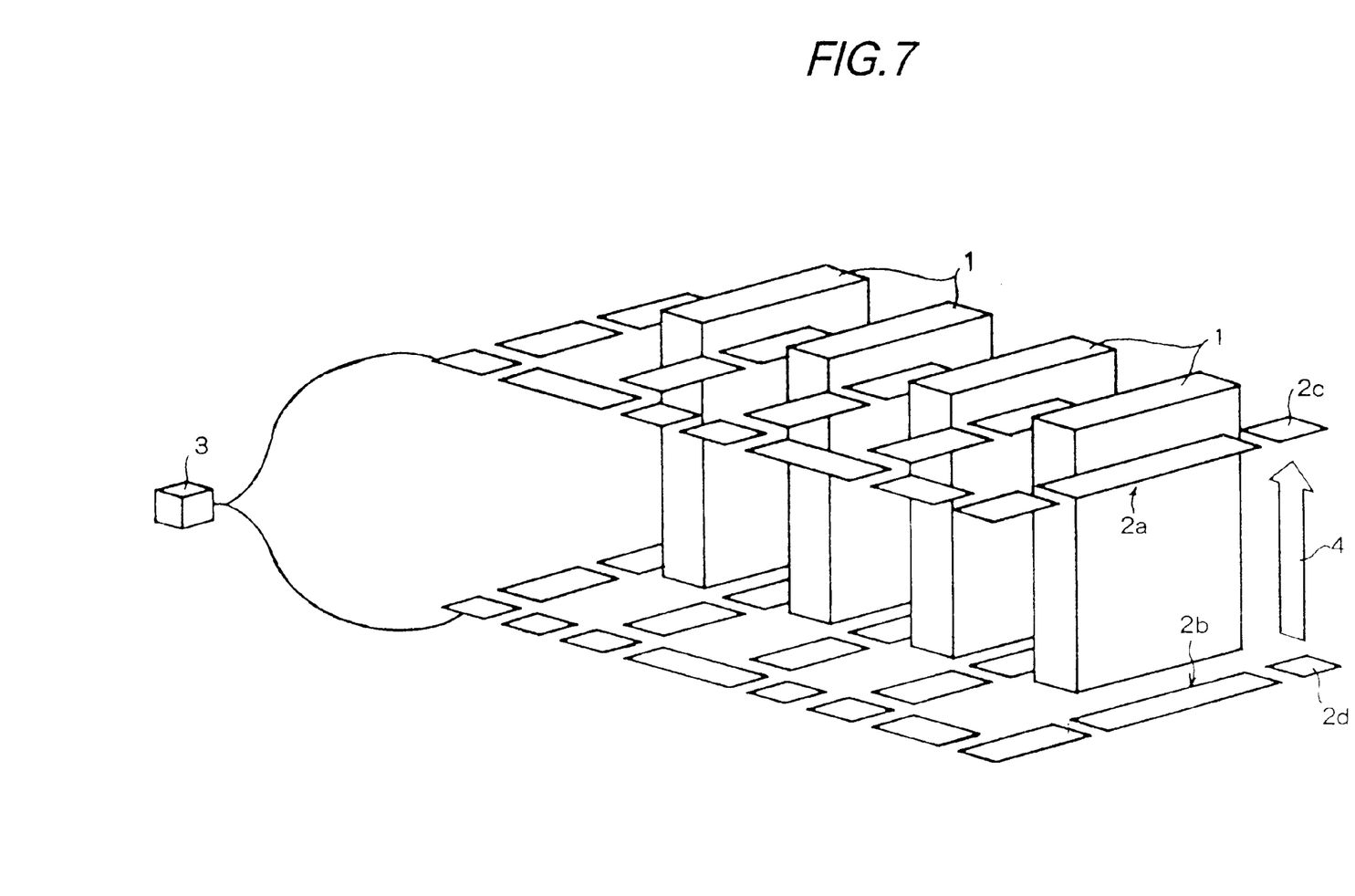
FIG. 7 is a perspective view of the summary construction of an automated shelf system.

FIG. 7 is a perspective, schematic view of an automated shelf system having a plurality of parts-shelves for storing production component parts conveyed by pallets in a production plant.

The automated shelf system therein comprises storehouse facilities 1, a storage conveyer 2a and a delivery conveyer 2b for conveying parts, respectively, for storage in and delivery from the facilities 1, and a control device 3 for controlling the operation of the conveyers 2a and 2b.

Each of component parts is placed on a pallet, conveyed through a storage inlet 2c provided for entry of the conveyer 2a and stored in a location in an indicated storehouse 1, and delivered through and out of a delivery outlet 2d provided for exit of the conveyer 2b. For communication between outlet 2d and inlet 2c, a lift 4 is provided.

The storage conveyer 2a and delivery conveyer 2b are installed: the former upstairs, while the latter downstairs.

In such an automated shelf system, any abnormal status occurrence at storage or delivery of production parts is informed by means of a lamp or buzzer or any other procedure to inform, and the operator examines the status of shelves or conveyance state of parts to verify which shelf location and with what content of troubles the abnormal state have occurred, and analyzes the cause thereof based on his experience to establish a measure therefor.

One of such troubles is the so called "Double storing" that occurs when new parts are entered in a parts shelf which is already occupied by several parts. Such a trouble is informed for the operator by means of a warning lamp or a buzzer, and the operator visually inspects the facilities and takes a suitable processing based on his experience. In the case of "Double Storing" above, one should verify whether there is a filled shelf or an empty shelf, and retry the storing operation when "empty shelf", or search the empty shelf to restore the parts when "filled shelf" is displayed.

However, in such a conventional shelf system, means for informing and means for trouble removing are separate from each other, so that it was time consuming before the operator verifies the trouble content, and analyzes the cause therefor to establish an adequate measure, and thereby sustaining the operation of facilities to lower the performance of the plant facilities. Also, since an adequate determination of the cause of trouble to establish an appropriate measure would require a higher skill, a less experienced operator is likely to mistake in determination to consume an excess time before the facility re-operates.

SUMMARY OF THE INVENTION

In view of the above-described problems, the present invention is to provide a method of processing an abnormal status and an apparatus therefor using a touch-panel monitor, capable of performing a quick elimination of abnormal status with selection of finding the trouble, the content and cause thereof in the manner of dialog communication viewing the monitor even by a less experienced person.

A method of processing an abnormal status in an automated parts shelf system of the invention comprises the steps of: displaying an occurrence of an abnormal status on a display screen of a touch-panel monitor having a touch-panel; displaying an abnormal status screen displaying a content of the abnormal status produced in response to pressing the display screen; and pressing an item of the abnormal status to process the abnormal status.

Also, a method of processing an abnormal status includes the steps of: pressing a predetermined area of the abnormal status screen to display items for processing the abnormal status as an item selection screen; and processing the abnormal status in accordance with items displayed on the item selection screen.

The item selection screen above is displayed as a form intercepting into the abnormal status screen.

An apparatus for processing an abnormal status in an automated parts shelf system according to the invention comprises a touch-panel monitor for displaying an occurrence of an abnormal status on a display screen; and a control device for displaying a content of the abnormal status produced in response to pressing the display screen for pressing an item of the abnormal status to process the abnormal status.

BRIEF DESCRIPTION OF THE DRAWINGS

FIGS. 3(a) and (b) are illustrative view of two images of a displayed abnormal status screen;

DETAILED DESCRIPTION OF THE PREFERRED EMBODIMENTS

The embodiment of an abnormal status treatment of the present invention is described especially in accordance with the so called "Double Storing" caused by entering new component parts onto a "Filled Shelf".

Figure 1:
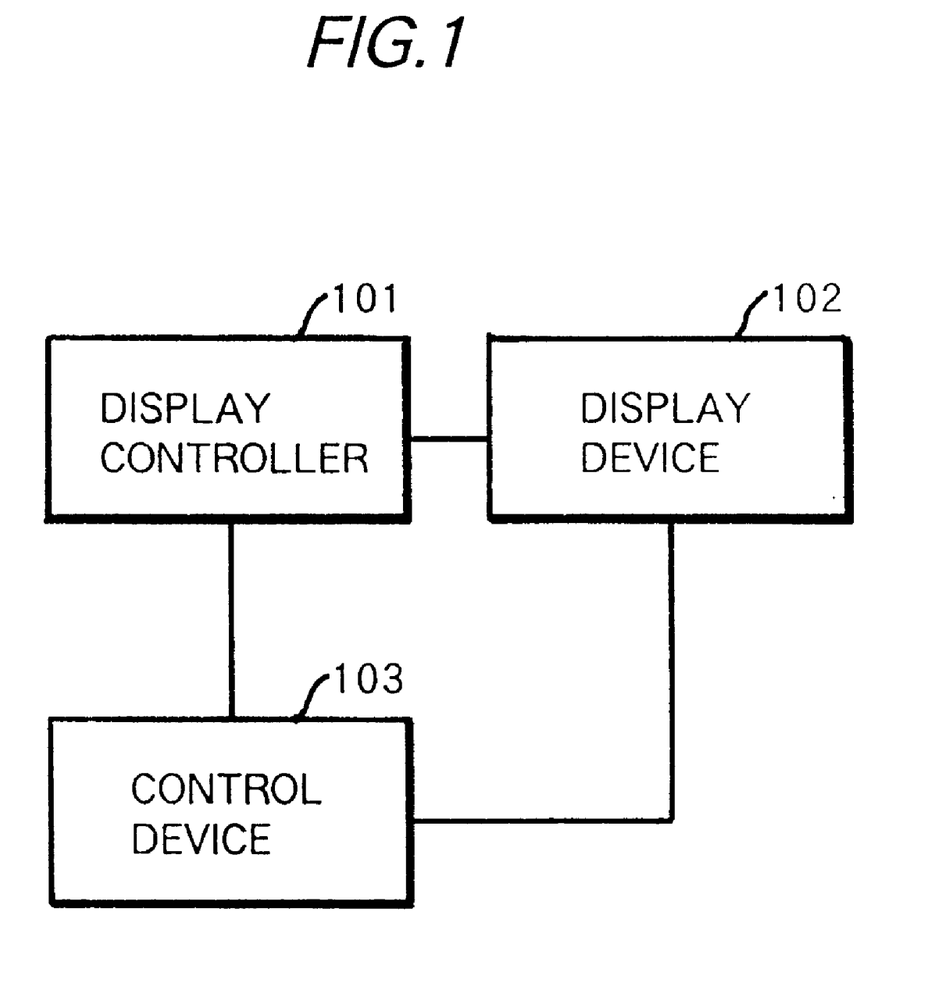
FIG. 1 is a block diagram of an apparatus for eliminating an abnormal status in an automated shelf system according to the present invention.

Referring now to FIG. 1, a fundamental structure of an apparatus of the present invention, performing elimination of abnormal status in an automated shelf system, comprising a display controller 102 for driving a touch-panel type monitor 101, and a control device 103 for displaying on a fundamental screen a occurrence of trouble in the shelf system, and also displaying the content of the trouble on an abnormal status screen, thereby handling the abnormal status occurring in the system through the pressing entry onto the touch-panel monitor.

On the abnormal status screen, not only the cause and countermeasure for the trouble is displayed, but also, upon pressing an indicated area in the ABNORMAL screen, an interception screen is displayed as an entry selection screen, which intercepts into the ABNORMAL screen to display the content of the trouble to be selected for entry. According to and reviewing the content items, the operator is allowed to select by pressing on the monitor to handle the abnormal status.

Figure 2:
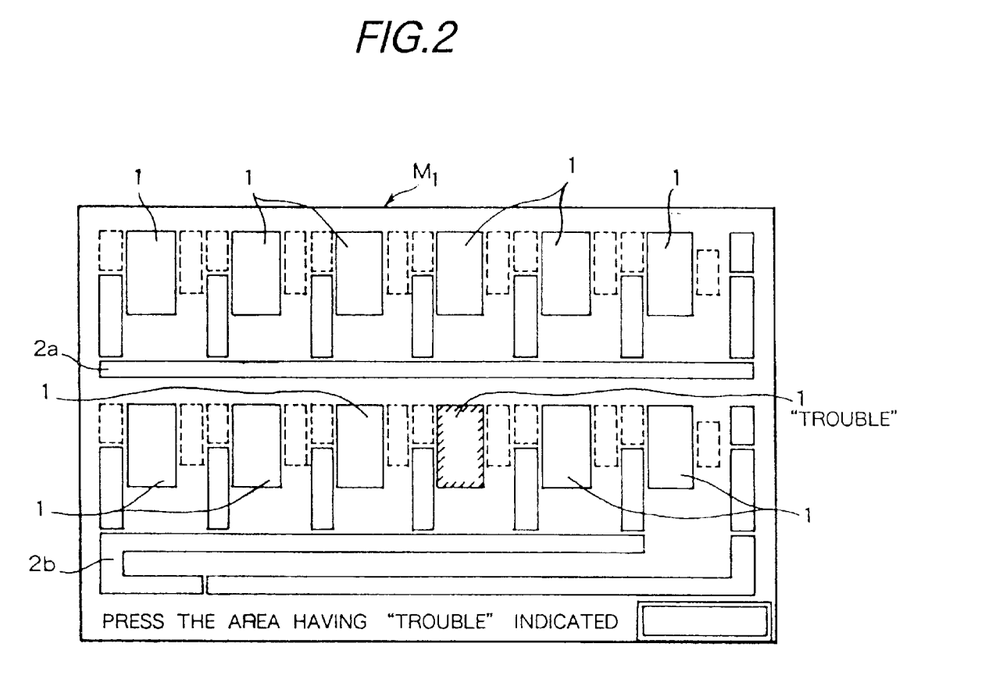
FIG. 2 is an illustration of a normal status screen displayed on a touch-panel monitor.
Figure 3:
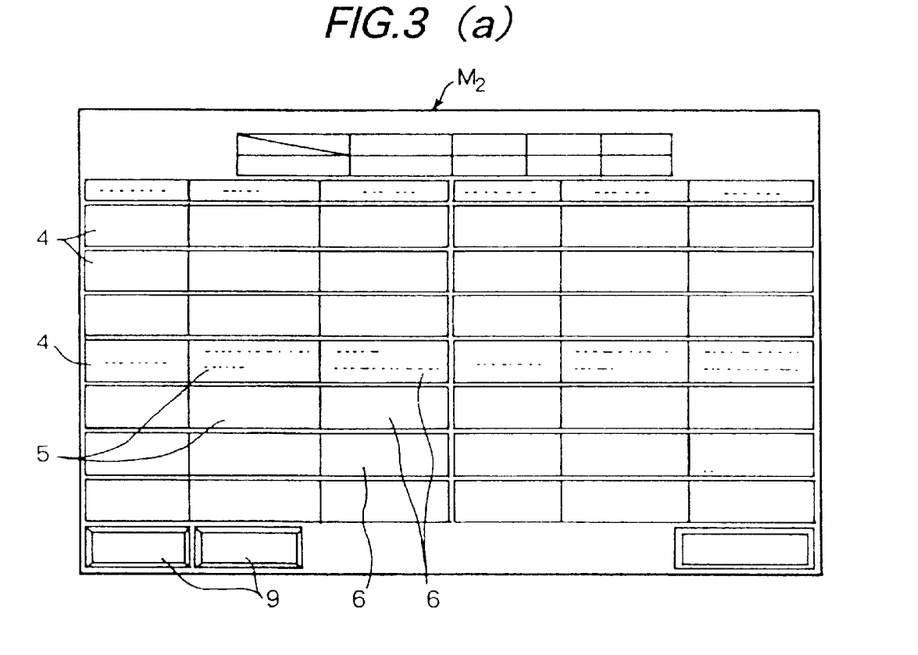
Figure 4:
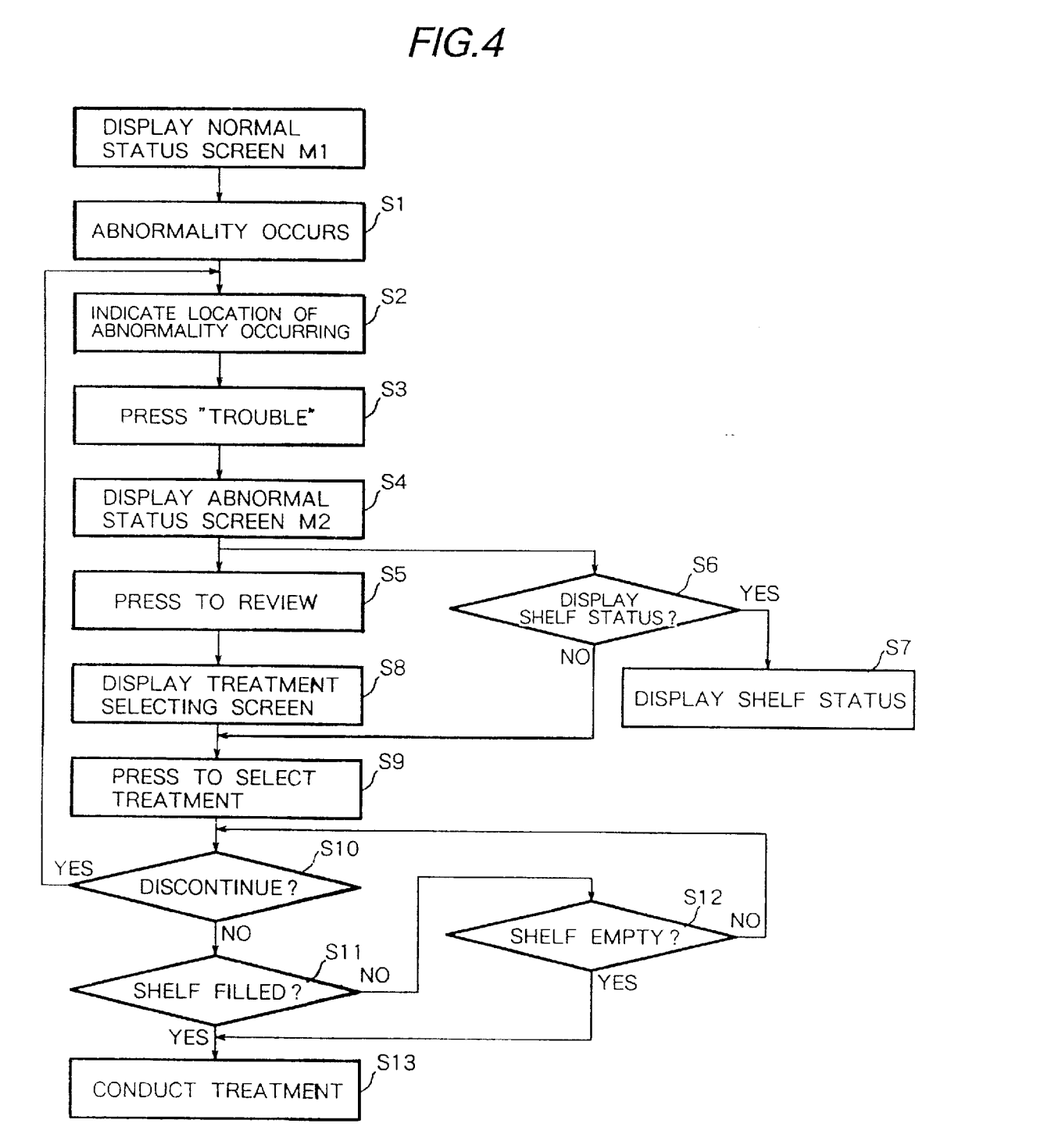
FIG. 4 is a flow chart illustrating the steps of performing abnormal status treatment.

FIG. 2 shows an example of a normal status screen displayed on the touch-panel monitor. FIG. 3(a) and (b) are a specific example of abnormal status screen displayed in response to selection by the operator upon occurrence of any abnormal status; FIG. 3(a) shows a screen indicating cause and countermeasure of the abnormal status, and FIG. 3(b) shows the content of trouble shooting provided for the operator to select. FIG. 4 is a flow chart illustrating an execution procedure of abnormal status treatment, and FIG. 6 is a schematic illustration of storehouse facilities to be controlled by the touch-panel monitor.

Figure 5:
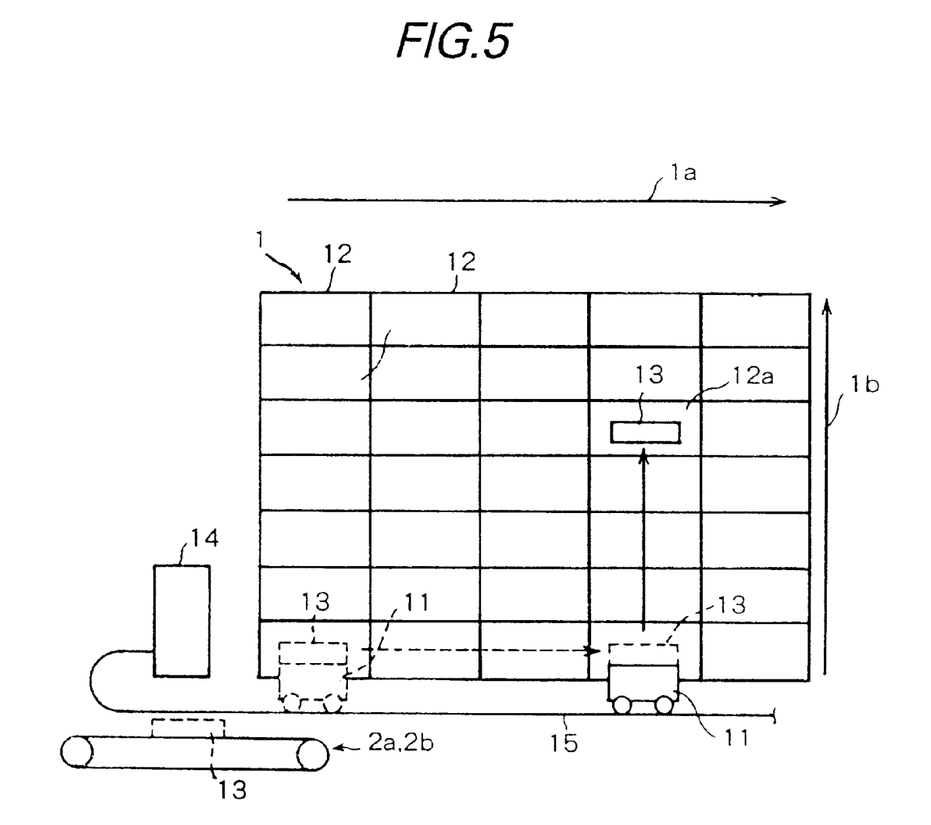
FIG. 5 is a schematic view illustrating storage operation of the system.
Figure 6:
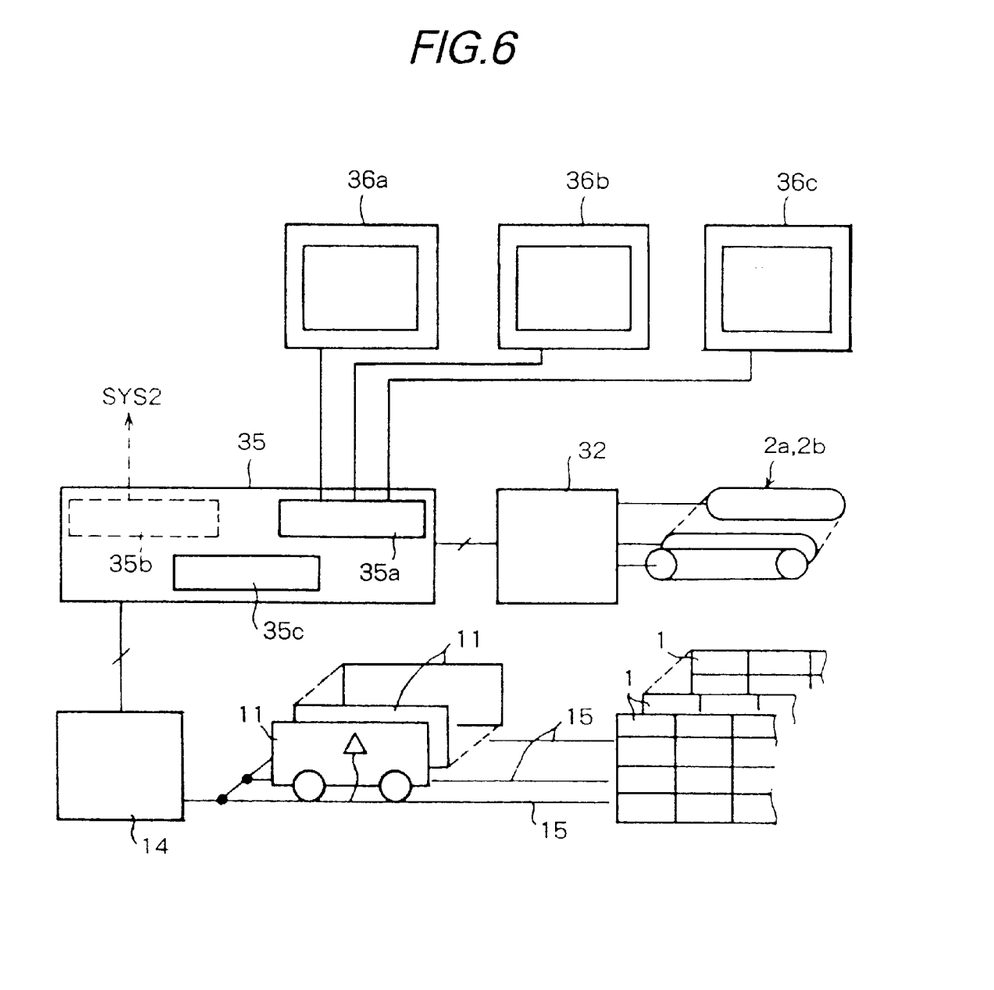
FIG. 6 is a schematic diagram illustrating the apparatus on the functional basis of each component.

It is to describe an automated shelf system controlled by a plurality of touch-panel monitors with reference to FIGS. 5 and 6.

As shown in FIG. 5, the equipment 1 comprises a transporter 11 and a plurality of part shelves 12 arranged lengthwise and crosswise for storing component parts on a selected shelf 12a therein.

The transporter 11, on which pallets having parts are placed, transports pallets, driven by a guiding control device 14, along a track 15 from conveyers 2a and 2b to an indicated lateral location of the shelf, and the parts are lifted by an elevator upwardly to the indicated shelf 12a to store the same thereon.

With reference to FIG. 6, the control system for the shelf system above includes a sequence control device 35 for the entire sequence, a conveyance controller 32 for storage/delivery conveyers 2a and 2b, touch-panel monitors 36a, 36b and 36c, and a guiding control device 14.

The second sequence control device 35 includes an input/output interface 35a for receiving from displays 36a, 36b and 36c an instruction of storage/delivery to inform the control status of the automated storehouse; a communication interface and a management device 35c.

Through the conveyance controller 32, the conveyers 2a and 2b are controlled, and, through the guiding controller 14, each of transporters 11 are guided.

The common memory stores the specification series including specification information of the parts to be stored and delivered, the status of storage including the present information of storage in each of parts shelves 12, and the status of conveyance including the present status of conveyance of the storage and delivery conveyers.

More specifically, device 35 is composed of a known sequence control or sequencer or the like, but alternatively another device having any programmable control means may be used.

The monitors 36a, 36b and 36c are connected to control device 35c via an I/O interface 35a, display each screen showing figures concerning the specification of parts and control status of the shelf system in the predetermined form, indicate the specific location and management business at the shelf system applied herein, and cause to enter the same to sequence control device 35, thereby allowing the operator to verify the control status and enter the instruction relating to storage/delivery of component parts by his pressing action.

Hereinafter described is the process of handling abnormal status in the shelf system relating to one of the monitors, but the operating procedure is the same also on the other monitors.

The description hereinafter is made with reference to the screens M1, M2 and M3, and a flow chart in FIG. 4.

In NORMAL STATUS screen M1, storehouse facilities 1, 1, . . . and conveyance paths of transporters 2a and 2b are displayed in conjunction with the arrangement state or the like conditions of actual storehouse facilities 1 making ease of being viewed by the operator. Also in the screen M1, the status of conveyance of component parts along the paths into the storehouse facilities 1 is displayed on a real time basis.

Step S1 finds an abnormal status, that is, an inadequate state such as concerning storage or delivery of the parts, then step S2 displays on the screen M1 to indicate the location where the trouble has occurred. A way for informing such a trouble to the operator may be of indication of "TROUBLE" on the displayed section corresponding to the facility as to which the trouble is displayed on, or alternatively with an inverted white-black image. With such a displayed image, the operator can easily recognize the storehouse equipment in which the trouble has actually occurred.

Upon occurrence of any trouble, or abnormal status, in the storehouse equipment, the content for the operator to select to enter is displayed in NORMAL STATUS screen: e.g., it is indicated "Press the section where 'TROUBLE' is displayed". To remove the trouble, the operator may press the section where the "TROUBLE" is displayed as step S3. Upon the pressing, the NORMAL STATUS screen M1 is replaced by a ABNORMAL STATUS screen M2 as shown in FIG. 3(a) as step S4: The screen M2 includes the columns 4 to list all the content of troubles possible to occur in the storehouse facilities 1, columns 5 indicating causes corresponding to each of the content of troubles, and columns 6 for each of countermeasures for the above.

Since the content of trouble in this embodiment is a "Double Storing", the column 4 is displayed as "DOUBLE STORING" in e.g. an inverted white-black image. In the same manner, a column 5 of CAUSE and a column 6 of COUNTERMEASURE, next to the column 4, are also displayed by inverted images. The operator, reading the items shown in CAUSE column 5 by an inverted image, is able to be aware of the parts which would have been attempted to be entered into a "filled shelf" which has been already filled with parts in the manner of "double storing".

In the left side bottom of ABNORMAL STATUS screen in FIG. 3(a), there is provided several "SHELF INFORMATION" columns 9, a pressing on which as steps S5 and S6 allows one to find, on which part shelf a "Double Storing" has actually occurred, and also to find the present status of storehouse facilities, such as which shelf is now empty, nominated step S7.

As a method of display, it may be to display each of parts shelves in the form of a mass block, and to display the status of each, including an empty, filled, and occurrence of abnormal status by a simple symbol or letter. In such a manner, the operator, without going directly to the location where the trouble occurs, can quickly find the location in any of shelves.

Pressing of the white-black inverted "COUNTERMEASURE" column 6 on ABNORMAL STATUS screen M2 will produce the intercept display of a TREATMENT SELECTION screen M2 intercepting into the ABNORMAL STATUS screen M2. Also, from the ABNORMAL screen M2, by conversion, the TREATMENT SELECTION screen M2 may be obtained. Using the SELECTION screen M2, the operator can operate according to the displayed items 8 on the screen M3 to select either one of the treatment selection columns 7, as step S9.

Step S10 determines whether to continue or discontinue and can press the DISCONTINUE column 7 to tentatively stop the treatment. S11 determines and selects the FILLED SHELF when desired to convey the new parts onto the shelf already containing parts. Thus, automatically an empty shelf can be searched to correct the storage status. Also, if, according to an erroneous sensing by the sensor, an "empty shelf" is mis-recognized as a "filled shelf", a column 7 of "EMPTY" may be selected, and thus the parts are again conveyed to the same shelf, as step S12. Which shelf should be selected according to a condition, may be displayed in column 8 as necessary. Further, step S13 performs a trouble shooting in accordance with the selected content.

As described above, in accordance with the displayed content in the manner of dialog communication, the abnormal status handling is performed in a shortest period of time.

Other than the case of "Double Storing" described above, any other trouble such as emergency stop, abnormal status in storage or delivery, or freight collapse can be also dealt with. In the case that the content of treatment is extremely restricted, it may be merely entered and instructed in TREATMENT SELECTION screen M2 with the specific content of treatment without displaying TREATMENT SELECTION screen M3. For example, when the cause corresponding to "EMERGENCY STOP" is "THE EMERGENCY STOP KEY HAS BEEN PRESSED", "RELEASE EMERGENCY TO OPERATE MAIN CIRCUIT" or the like may be displayed in the COUNTERMEASURE column 6. Also, in the case that the cause is extremely limited such as the content pressed by the operator being invalid, immediately the content of abnormal status treatment may be displayed, at the same time together with the content of the abnormal status itself. According to the treatment indicated, the operator can perform the treatment for the abnormal status.

According to the present invention, it is provided a variety of improvements in working efficiency and in operability of the storehouse equipment.

Although the invention has been described in detail with reference to a particular preferred embodiment, those skilled in the art should recognize that various modifications may be made without departing from the gist of the present invention.

What is claimed is:

1. A method of operating an automated parts shelf system comprising the steps of:

displaying an occurrence of an abnormal status in said automated parts shelf system, wherein said displaying step occurs on a display screen of a touch-panel monitor having a touch-panel;

displaying an abnormal status screen displaying a content of said abnormal status produced in response to pressing said display screen;

pressing an item of said abnormal status screen to process said abnormal status;

displaying a cause and countermeasure for said abnormal status;

pressing a predetermined area of said abnormal status screen to display items for processing said abnormal status as an item selection screen; and processing said abnormal status in accordance with items displayed on said item selection screen.

2. The method according to claim 1 wherein said abnormal status is a double storing condition.

3. The method according to claim 1 wherein said abnormal status is an emergency stop condition.

4. The method according to claim 1 wherein said abnormal status is an abnormal delivery condition.

5. The method according to claim 1 wherein said abnormal status is a freight collapse condition.

6. A method of operating an automated parts shelf system comprising the steps of:

displaying an occurrence of an abnormal status in said automated parts shelf system, wherein said displaying step occurs on a display screen of a touch-panel monitor having a touch-panel;

displaying an abnormal status screen displaying a content of said abnormal status produced in response to pressing said display screen;

pressing an item of said abnormal status screen to process said abnormal status;

displaying a cause and countermeasure for said abnormal status;

pressing a predetermined area of said abnormal status screen to display items for processing said abnormal status as an item selection screen; and processing said abnormal status in accordance with items displayed on said item selection screen;

wherein said item selection screen is displayed as a form intercepting into said abnormal status screen.

7. The method according to claim 6 wherein said abnormal status is a double storing condition.

8. The method according to claim 6 wherein said abnormal status is an emergency stop condition.

9. The method according to claim 6 wherein said abnormal status is an abnormal delivery condition.

10. The method according to claim 6 wherein said abnormal status is a freight collapse condition.

* * * * *